United States Patent [19]
Takeuchi

[11] 4,302,786
[45] Nov. 24, 1981

[54] APPARATUS FOR DETECTING THE STOP OF A MAGNETIC TAPE TRAVELING IN A MAGNETIC RECORDING AND REPRODUCING DEVICE

[75] Inventor: Eiichi Takeuchi, Iruma, Japan

[73] Assignees: Casio Computer Co., Ltd.; Olympus Optical Co., Ltd., both of Tokyo, Japan

[21] Appl. No.: 12,117

[22] Filed: Feb. 14, 1979

[30] Foreign Application Priority Data

Feb. 24, 1978 [JP] Japan .................................. 53-20620

[51] Int. Cl.$^3$ ............................................ G11B 15/48
[52] U.S. Cl. .................................... 360/74.2; 360/744
[58] Field of Search ..................... 360/137, 74.4, 74.2

[56] References Cited
U.S. PATENT DOCUMENTS

| | | | |
|---|---|---|---|
| 3,946,436 | 3/1976 | Takashino | 360/74.2 |
| 4,000,518 | 12/1976 | Stearns | 360/74.4 |
| 4,140,896 | 2/1979 | Robertson | 360/137 |
| 4,172,266 | 10/1979 | Onishi | 360/74.2 |
| 4,177,488 | 12/1979 | Sakai | 360/137 |

FOREIGN PATENT DOCUMENTS

| | | | |
|---|---|---|---|
| 2303622 | 8/1973 | Fed. Rep. of Germany | 360/74.2 |
| 2707797 | 2/1977 | Fed. Rep. of Germany | 360/74.2 |

*Primary Examiner*—Vincent P. Canney
*Attorney, Agent, or Firm*—Frishauf, Holtz, Goodman and Woodward

[57] ABSTRACT

An apparatus for detecting the stop of a magnetic tape traveling in a magnetic recording and reproducing device which carries out a plurality of functional modes and in which the magnetic tape travels at a speed corresponding to a selected functional mode, wherein a pulse generator produces one pulse per rotation of a magnetic tape-driving section. A time interval between the respective pulses issued from said pulse generator is determined from a number of reference pulses having a reference frequency which are delivered from a reference pulse generator and are later counted by a counter. A longer traveling time of a magnetic tape than that specified for the different functional modes is preset in a numeral code generator in the form of a numeral code. When the traveling time of a magnetic tape is found to be longer than that present for a selected functional mode, a detection signal based on an output count from the counter is issued to judge whether the magnetic tape has ceased to run.

7 Claims, 3 Drawing Figures

APPARATUS FOR DETECTING THE STOP OF A MAGNETIC TAPE TRAVELING IN A MAGNETIC RECORDING AND REPRODUCING DEVICE

BACKGROUND OF THE INVENTION

This invention relates to an apparatus for detecting the stopping of a magnetic tape traveling in a magnetic recording and reproducing device such as a cassette tape recorder.

With a recording and reproducing device like a cassette tape recorder, a traveling tape is generally made to stop when the tape has run to its terminal end, and when a push button, for example, is operated to bring the tape to rest in a desired position. With the known recording and reproducing device, the mechanical process of detecting the tape stop in the case of stopping at the terminal end is carried out as follows. When a tape traveling between both tape reels with a proper tension has run to its terminal end, then the tension on the tape increases. This increased tape tension is transmitted to a takeup reel to actuate an electric switch, thereby detecting that the tape has traveled to its terminal end. However, the above-mentioned stop-detecting mechanical process has the drawbacks that a cassette tape recorder is complicated in construction, becomes bulky and has a lower durability. Recently, therefore, there has been proposed in place of the aforesaid mechanical process a system in which a pulse generator is provided to issue one pulse per rotation of a tape-driving rotor, thereby measuring a time interval between the respective pulses produced by said generator. With the proposed system, the above-mentioned time interval between the respective pulses is determined by a monostable multivibrator selected by a predetermined RC time constant. Therefore, said proposed system still has the drawbacks that the aforesaid step of driving the electric switch by the increased tension of a magnetic tape when it has run to its terminal end is carried out with a lower precision and further is unadapted for the ordinary or large scale integration (LSI) circuitry. In the case of operation using a push button, the push button signal is supplied as a direct stop signal to a built-in control circuit separately from the tape end detection signal used in the operation of stopping at the terminal end of the tape. Where, therefore, said control circuit is modified into an IC version, it is necessary to provide two input terminals one for the tape end detection signal and one for the push button signal. Such arrangement is not preferred for large scale integration (LSI) circuitry, which must contain as few terminals as possible.

With the proposed recording and reproducing device, a magnetic tape is made to run at widely different speeds for the respective functional modes. Where, under such condition, the tape stop is detected by measuring a time interval between pulses issued per rotation of the rotor, said detection is carried out by the RC time constant of a single monostable multivibrator. Therefore, it is necessary to set said RC time constant at a tape stop detection time corresponding to the longest among those used with the plural functional modes. Accordingly, the proposed recording and reproducing device has presented considerable difficulties in detecting the stop of a tape while running at different speeds by measuring a time interval between the respective pulses issued per rotation of the rotor.

Where the tape stop detection time is preset at the conceivably longest level, in other words, at a level required for the functional mode in which a magnetic tape is made to run most slowly, then as wide a difference as several seconds arises between a tape stop detection time during the feed mode in which a magnetic tape runs fastest and a tape stop detection time during the above-mentioned mode in which the magnetic tape travels most slowly, particularly with respect to a small battery-driven recording and reproducing device such as a microcassette tape. Where it is attempted to cut off power supply to, for example, a motor by a detection signal during the functional mode in which detection of a tape stop takes the longest time, then the motor consumes too large an amount of power to be overlooked during said period of several seconds. Consequently, it has been strongly demanded to improve the above-described pulse interval-measuring system for detection of a tape stop.

SUMMARY OF THE INVENTION

This invention has been accomplished in view of the above-mentioned circumstances, and is intended to provide a tape stop-detecting apparatus for a magnetic recording and reproducing device which makes it possible to preset a tape stop detection time at any of the different travelling speeds of a magnetic tape corresponding to the specified functional modes and which can detect the stop of the magnetic tape easily and unfailingly by a simple circuit arrangement.

To attain the above-mentioned object, this invention provides a tape stop-detecting apparatus which comprises a pulse generator for issuing one pulse per rotation of a magnetic tape-driving rotor; a reference pulse generator for producing a pulse having a reference frequency; time-measuring means for defining a time interval between respective pulses issued from the pulse generating means by counting a number of reference pulses delivered from the reference pulse generator; function mode-selecting means for selecting any of a plurality of function modes for which the magnetic recording and reproducing device is originally designed; means for presetting a length of time required to detect the stop of a magnetic tape traveling at a speed corresponding to a selected functional mode; and detection signal generating means for detecting whether a time interval between the respective pulses measured by said time measuring means has exceeded a tape stop detection time preset for a functional mode selected by the functional mode-selecting means and for issuing a detecting signal denoting said tape stop.

With a tape stop detecting apparatus embodying this invention which has been arranged as described above, a time interval between the respective pulses issued per rotation of the magnetic tape driving rotor is electronically measured to detect the stop of a magnetic tape if it happens. Therefore, the present tape stop detecting apparatus is more simplified in arrangement and rendered more reliable than the prior art tape stop detecting device. Further, a time interval between the respective pulses issued per rotation of the rotor is measured by counting reference pulses generated during said time interval. Even where, therefore, the tape runs at a speed varying with a plurality of functional modes, the tape stop can be detected by presetting a tape stop detection time corresponding to a selected function mode without presetting the longest tape stop detection time. Further, if reference pulses are issued at a closer interval, a tape stop will be detected unfailingly with greater precision.

It is also possible to quickly detect any failure of a tape driving system which has caused a tape to run at a speed much lower than that previously specified for a selected functional mode. According to this invention, the detection of the completion of a tape feed and the stop of a tape during its run can be detected by supplying the same form of pulses, thereby decreasing a number of input terminals. Moreover, a time interval between said input pulses is measured by counting a number of reference pulses without using, for example, a capacitor. Therefore, the tape stop detecting apparatus of this invention is well adapted for integrated circuit fabrication techniques.

DETAILED DESCRIPTION OF THE PREFERRED EMBODIMENTS

Figure 1:
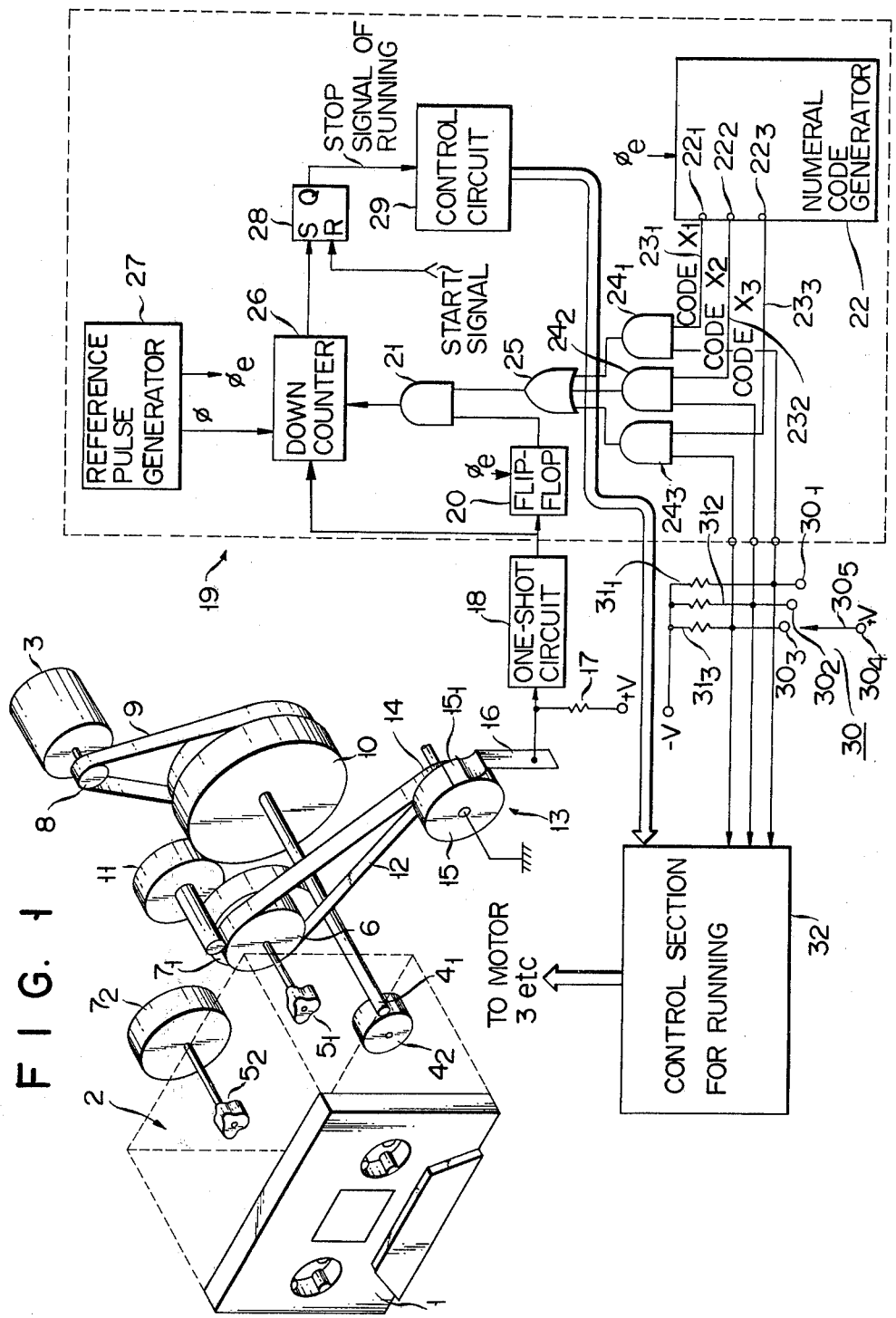
FIG. 1 schematically shows the arrangement of a tape stop detecting apparatus embodying this invention.

FIG. 1 shows the arrangement of a tape stop detecting apparatus embodying this invention. A magnetic tape cassette 1 is fitted to a tape loader 2 and made to run by means of a pinch roller $4_2$ driven by a capstan shaft $4_1$ rotated by the motor 3 and reel shafts $5_1$, $5_2$ through a later described specified interlocking mechanism. The reel shaft $5_1$ is fitted with an assembly of a first pulley 6 for rotating the later described pulse generator 13 and a reel $7_1$ directly coupled to said pulley 6. The first pulley 6 is rotated with the reel $7_1$ by the motor 3 through a prescribed interlocking mechanism which comprises a second pulley 8 directly coupled to the shaft of the motor 3, a flywheel 10 driven by the joint action of the second pulley 8 and a belt 9 and an idler 11 for transmitting the rotation moment of the flywheel 10 to the reel $7_1$. The rotating of the first pulley 6 is transmitted to a third pulley 14 included in the pulse generator 13. The reel shaft $5_2$ is also rotated by the motor 3 when the idler 11 is brought into contact with the reel $7_2$ concentrically mounted on said reel shaft $5_2$ through a belt (not shown). The pulse generator 13 comprises a disc electrode 15 integrally formed with the third pulley 14 and a conductive detector 16 elastically contacting the periphery of the disc electrode 15. The periphery of disc electrode 15 except for the insulated portion $15_1$ is rendered conducting. The conductive peripheral portion of the disc electrode 15 is grounded through the rotary shaft thereof. The elastic conductive detector 16 has its potential stepped up to $+V$ volts through a resistor 17. When the elastic detector 16 slides along the periphery of the disc electrode 15 during its rotation, output signals having a logic level of "1" ($+V$ volts) and a logic level of "0" (grounding volts) are alternately produced. When the detector 16 contacts the insulated portion $15_1$ of the disc electrode 15, the output signal has a logic level of "1". When the detector 16 contacts the remaining conductive portion of the disc electrode 15, the output signal has a logic level of 37 0". Output signals from the detector 16 are supplied to a one-shot circuit 18 which detects the rise of the output signals from the "0" level to the "1" level and sends forth a one-shot trigger pulse. A logic section 19 detects the stop of a traveling tape through measurement of a time interval between the respective pulses issued by the one-shot circuit 18 from a counted number of reference pulses produced by a reference pulse generator 27. An output trigger pulse from the one-shot circuit 18 is supplied as a control signal to one of the input terminals of an AND circuit 21 in synchronization with an output signal from a delay type flip-flop circuit 20 which is supplied with a clock control signal $\phi_e$. A numeral code generator 22 issues a plurality of specified numerical codes in synchronization with said clock control signal $\phi_e$. Preset in said numeral code generator 22 are some prescribed values for defining the tape stop detection times specified for a plurality of function modes. A tape stop detecting apparatus according to the foregoing embodiment is chosen to carry out, for example, three functional modes. Three numeral code signals $X_1$, $X_2$, $X_3$ are sent forth from the output terminals $22_1$, $22_2$, $22_3$ through the corresponding output lines $23_1$, $23_2$, $23_3$, which are connected to one of the input terminals of the AND circuits $24_1$, $24_2$, $24_3$ respectively. Output signals from the AND circuits $24_1$, $24_2$, $24_3$ are supplied through an OR circuit 25 to one of the input terminals of an AND circuit 21, an output signal from which is conducted as a preset signal to a down counter 26. Down counter 26 is also arranged to receive reference pulses $\phi$ having a prescribed frequency, for example, 16 kHz which are issued from the reference pulse generator 27 to measure a time interval between the respective pulses delivered from the pulse generator 13. The down counter 26 substracts a count of 1 from the aforesaid already stored preset signals, each time a time interval measuring reference pulse $\phi$ is supplied from the reference pulse generator 27. Where a count previously made by the down counter 26 is reduced to zero due to down counting, then said down counter 26 produces an output signal having a logic level of "1", thereby measuring a time interval between the respective pulses sent forth from the pulse generator 13. A number represented by a preset coded signal supplied from the numeral code generator 22 and the frequency of the time interval measuring reference pulse $\phi$ have such a relationship that when the magnetic tape runs under the normal condition, the count of the down counter 26 is not reduced to zero. A borrow signal issued from the down counter 26, that is, an output signal having a logic level of "1" which is issued from said down counter 26 when its count has been reduced to zero is conducted as a set signal to the set terminal of a flip-flop circuit 28 which is set upon receipt of a start instruction. A set output signal from the flip-flop circuit 28 is supplied to a control circuit 29 as a tape stop detection signal. The reference pulse generator 27 also issues a synchronization pulse $\phi_e$ in order to insure synchronization throughout the entire tape stop detecting apparatus of this invention, in addition to the aforesaid time interval measuring reference pulses $\phi$. In this case, one synchronization pulse $\phi_e$ is issued, each time 20 time interval measuring reference pulses $\phi$ are produced.

A functional mode selecting switch 30 is used to select any of the three functional modes such as play, fast feed and reverse or any of the functional modes associated therewith. The contacts $30_1$, $30_2$, $30_3$ of said switch 30 are connected to a negative potential side of $-V$ volts through corresponding resistors $31_1$, $31_2$, $31_3$, and also to the AND circuits $24_1$, $24_2$, $24_3$. A stationary contact $30_4$ is connected a high potential side of $+V$ volts. Where a movable actuator $30_5$ of the functional mode selecting switch 30 contacts, for example, a contact $30_1$ chosen from the aforesaid three contacts $30_1$, $30_2$, $30_3$, then the voltage of an input signal to the logic section 19 is shifted to $+V$ volts (having a logic level of "1"), and the gate of the AND circuit $24_1$ is opened upon receipt of a gate signal having a logic level of "1". Output signals from the contacts $30_1$, $30_2$, $30_3$ of the functional code selecting switch 30 are also supplied to a tape run control section 32 for controlling the operation of a drive system including the motor 3. The rotational speed of the motor 3 is controlled by a functional mode changeover control signal supplied from the tape run control section 32, thereby adjusting the traveling speed of a magnetic tape. The changeover of the traveling speed of the magnetic tape may be effected by a prescribed mechanical interlocking system, instead of controlling said traveling speed electrically by the functional mode selecting switch 30. As mentioned above, the control circuit 29 issues various control signals to the tape run control section 32.

Figure 2:
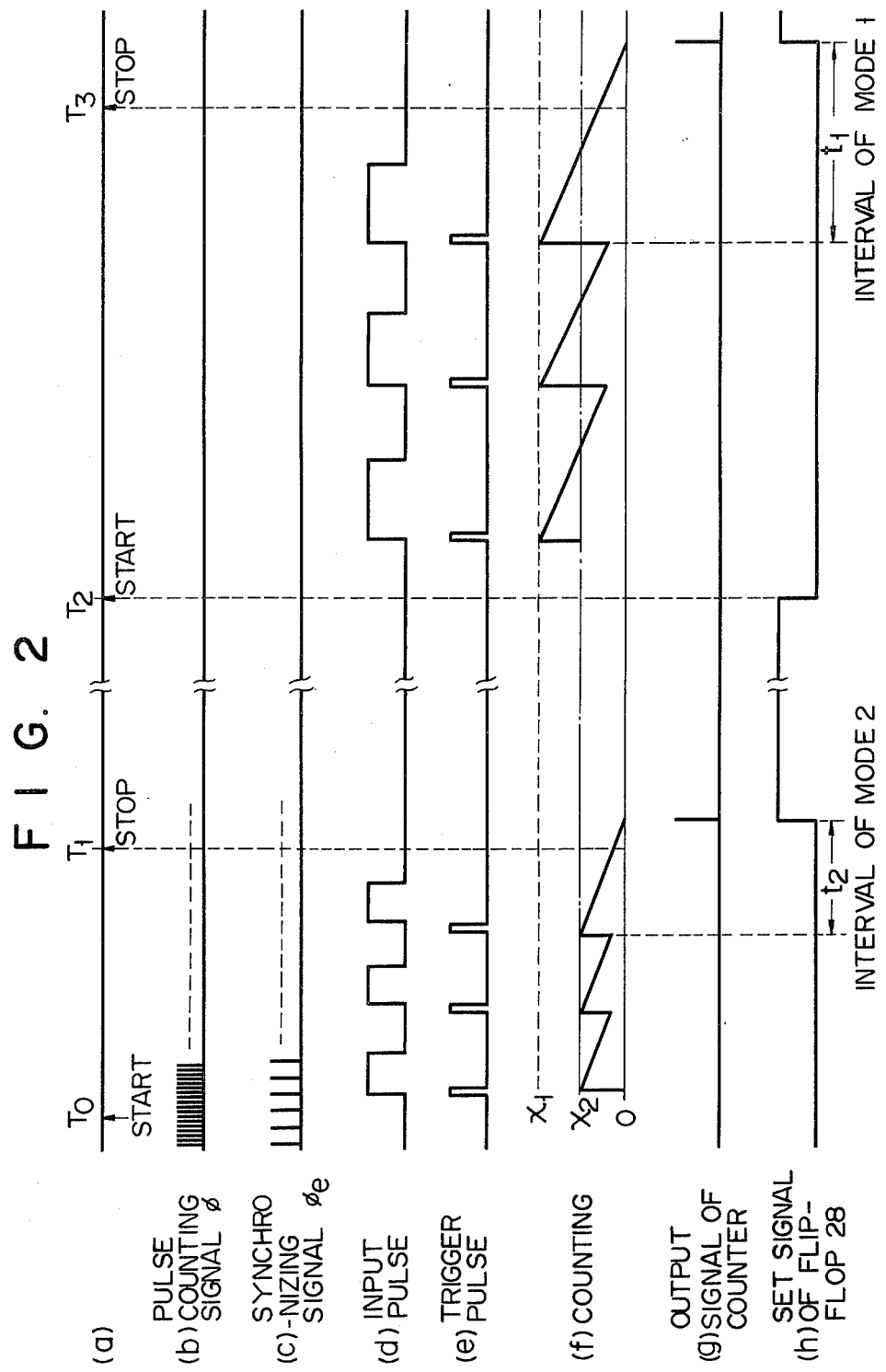
FIG. 2 is a time chart, illustrating the operation of the embodiment of FIG. 1.

There will now be described by reference to FIG. 2 the operation of a tape stop detecting apparatus embodying this invention which is arranged as described above. Now let it be assumed that referring to FIG. 2(a), a rewind button is operated, and the movable actuator $30_5$ of the functional made selecting switch 30 contacts a contact $30_2$. Then a signal of $+V$ volts having a logic level of "1" is supplied from said contact $32_2$ to the tape run control section 32. At this time, said control section 32 issues various control signals to the drive system including the motor 3 in order to rotate a cassette tape 1 in the direction corresponding to a selected functional mode at a speed preset therefor. The motor 3 is made to run by said control signals, for example, clockwise, at a rotational speed corresponding to a selected functional mode. The rotation moment of the motor 3 is transmitted, for example, to the reel $7_1$ used for the tape take-up through the second pulley 8, belt 9, flywheel 10, and idler 11. The take-up reel $7_1$ is thus rotated clockwise with the reel shaft $5_1$ at a prescribed speed. Since, at this time, the flywheel 10 and capstan shaft $4_1$ are also turned, the pinch roller $4_2$ is driven. Therefore, the cassette tape 1 runs in the direction in which the tape is taken up on said reel $7_1$ at a speed of 3.4 cm/sec in the case of a rewind mode. At this time, the first pulley 6 rotates with the reel shaft $5_1$. The rotation moment of the first pulley 6 is transmitted to the third pulley 14 of the pulse generator 13 by means of the belt 12. As a result, the disc electrode 15 integrally formed with the third pulley 14 is rotated at a prescribed speed with the elastic detector 16 made to slide along the periphery of the disc electrode 15. Since, as previously described, the greater part of the periphery of the disc electrode 15 is rendered conducting, and the remainder $15_1$ of said periphery is rendered nonconducting, a pulse of $+V$ volts having a logic level of "1" (FIG. 2(d)) is issued from the detector 16, each time the nonconducting section $15_1$ passes by the detector 16.

In other words, the pulse generator 13 produces one pulse each time the disc electrode 15 makes one rotation. A time interval between the respective pulses corresponds to the rotating speed of the disc electrode 15. With the foregoing embodiment, the rotating speed of a tape is taken to be 3.4 cm/sec as previous described. Under this condition, the rotating speed of the disc electrode 15 is so controlled as to set the aforesaid time interval between the respective pulses issued from the pulse generator 13 at 250 msec at maximum. A pulse sent forth from the pulse generator 13 is delivered to the oneshot circuit 18, and then conducted to the delay type flip-flop circuit 20 of the logic section 19 as a trigger pulse having a narrow width as shown in FIG. 2(e). The trigger pulse is supplied as a gate signal from the output side of the flip-flop circuit 20 to one of the input terminals of the AND gate 21 in synchronization with a clock control signal $\phi_e$. Since, at this time, an output signal of $+V$ volts (having a logic level of "1") from, for example, the functional mode selecting contact $30_2$ is conducted to the corresponding AND circuit $24_2$ chosen from those ($24_1$, $24_2$, $24_3$) used to select a numerical code, a numeral code signal $X_2$ alone is selected from among the numeral code signals $X_1, X_2, X_3$ which are respectively sent forth from the output terminals $22_1$, $22_2$, $22_3$ of the numerical code generator 22 in synchronization with the clock control signal $\phi_e$. The numeral code signal $X_2$ is supplied to the other input terminal of the AND circuit 21 through the AND circuit $24_2$ and OR circuit 25. As a result, the numeral code signal $X_2$ passes through the AND circuit 21 and is supplied as a preset input signal to the down counter 26, which in turn is preset to a number represented by the numeral code $X_2$. As used in the foregoing embodiment, the numeral code $X_2$ is taken to denote a number "4500". The contents of the down counter 26 are decreased by a count of 1, each time the counter 26 receives from the reference pulse generator 27 a reference pulse of a prescribed frequency which is used to measure a time interval between the pulses issued from the pulse generator 13. Therefore, the contents of the down counter 26 become nearer to zero as time goes on (FIG. 2(f)). As previously described, the preset numeral code denotes a number of "4500", and the time interval measuring reference signal has a frequency of 16 kHz (i.e., a period of about 62.5 microseconds). Therefore, a length of time required for the number "4500" preset in the down counter 26 to be reduced to zero is 281 milliseconds. In contrast, while the tape is traveling during the functional mode represented by the aforesaid numeral code signal $X_2$, a time interval between the respective pulses issued from the pulse generator 13 is 250 milliseconds at maximum. Therefore the succeeding pulse is sent forth from the pulse generator 13, before the contents of the down counter 26 are reduced to zero. Thus, the numeral code $X_2$ is again supplied as a preset input signal to the down counter 26 from the AND circuit 21 by the previously described operation steps. The contents of the down counter 26 are again set to a number represented by the numeral code $X_2$, and down counting is again commenced. While the tape is traveling at a speed specified for the functional mode represented by the numeral code $X_2$, the above-mentioned operation cycle is repeated. Under such condition, the down counter 26 does not generate an output signal, nor is the flip-flop circuit 28 set.

Now let it be assumed that at time $T_1$, a tape has run to its terminal end. Then the increased tension of the tape causes, for example, the reel shaft $5_1$ to stop and to slip against the rotating moment of the motor 3 by means of a slip mechanism (not shown). As a result, the first pulley 6 and the third pulley 14 coupled thereto by the belt 12 are also brought to rest. Consequently, the disc electrode 15 is not rotated, preventing a pulse from being sent forth from the one-shot circuit 18. The gate of the AND circuit 21 is closed, and a preset signal ceases to be supplied to the down counter 26. At this time, only down counting is continued in the down counter 26 due to the supply of time interval measuring reference pulses. As time goes on, therefore, the contents of the down counter 26 are reduced to zero. Accordingly, the down counter produces an output signal having a logic level of "1", which in turn is conducted to the set terminal of the flip-flop circuit 28. A tape stop detection signal is issued from the set output terminal of the flip-flop circuit 28. This tape stop detection signal is delivered to the control circuit 29 of the logic section 19. Thereafter, various control operations are carried out. For instance, a tape stop detection signal is supplied from the control circuit 29 to the tape run control section 32, which in turn issues an instruction to stop power supply to the motor 32.

Now let it be assumed that at time $T_2$, a play button is operated and the movable actuator $30_5$ of the functional mode selecting switch 30 has touched the contact $30_1$; the motor 3 makes a reverse rotation, and the cassette tape 1 is made to run in the opposite direction to the case of the rewind mode at a speed equal to 1/15 of the traveling speed of 2.4 cm/sec during the rewind mode. Since, during the play mode, the tape runs at a far lower speed than during the rewind mode, the disc electrode 15 is obviously turned slowly. As a result, the pulses issued from the pulse generator 13 decrease in frequency and a time interval between the respective trigger pulses sent forth from the one-shot circuit 18 is extended accordingly. A numeral code $X_1$ which the numeral code generator 22 generates in conformity to the play mode also has an increased value. Since, during the play mode, the tape runs more slowly than during the rewind mode, the pulses are issued from the pulse generator 13 at a longer interval. A numeral code signal $X_1$ is made to represent such a number as causes the down counter 26 to down count from a larger number than the number of reference pulses which will be generated during said extended time interval. Said numeral code signal $X_1$ is issued from the output terminal $22_1$ of the numeral code generator 22 through the AND circuit $24_1$, OR circuit 25 and AND circuit 21 to be preset in the down counter 26. During the play mode, therefore, the down counter 26 carries out the down counting of a larger number than during the rewind mode. As a result, the detection of a tape stop consumes a longer time than during the rewind mode. According to this invention, a value corresponding to that time interval between the respective pulse issued from the pulse generator 13 which varies with a selected functional mode is preset in the down counter 26. Therefore, the tape stop can be reliably detected with greater precision than has been possible in the past, by changing a tape stop detection time according to the traveling speed of the tape specified for the selected functional mode.

Figure 3:
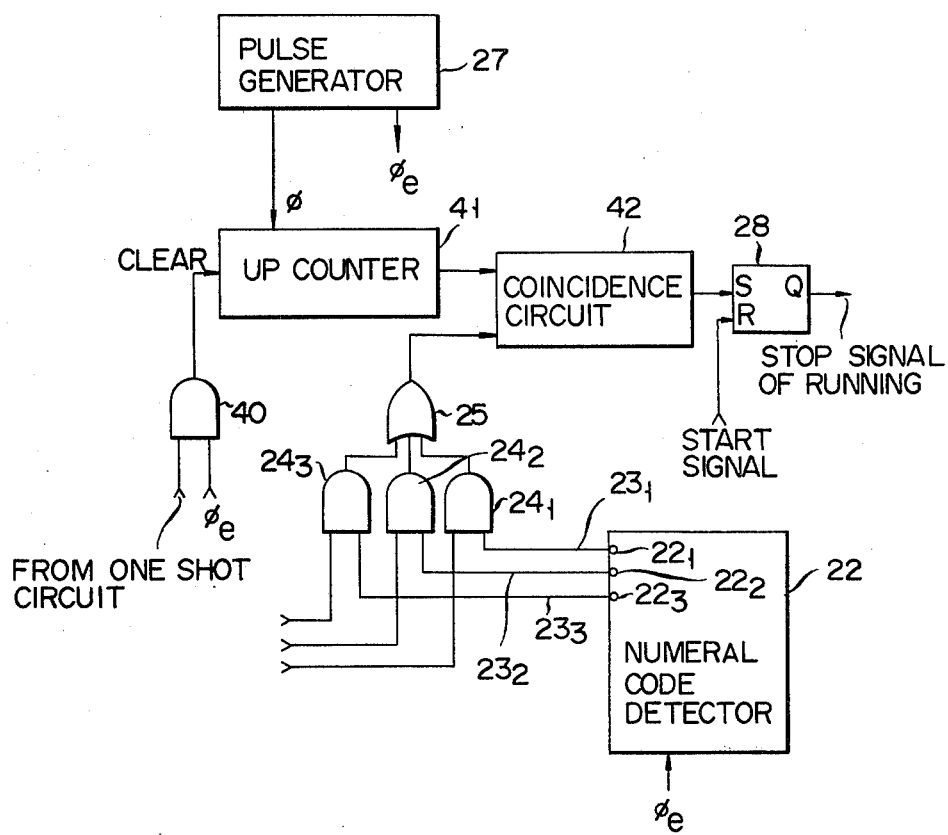
FIG. 3 is a block circuit diagram showing the logic circuit section of FIG. 1 modified according to another embodiment of the invention.

There will now be described by reference to FIG. 3 the arrangement and operation of the logic section 10 modified according to another embodiment of the invention. In the parts of FIG. 3 the same as those of FIG. 1 are denoted by the same numerals, description thereof being omitted. Reference is only made to the parts different from FIG. 1. A trigger pulse issued from the one-shot circuit 18 is supplied to the AND circuit 40 together with a clock synchronization pulse $\phi_e$. An output signal from said AND circuit 40 is supplied as a clear signal to an up counter 41, which is supplied with a time interval measuring reference pulse $\phi$ from the reference pulse generator 27. An output signal from the up counter 41 is delivered as a time interval measuring signal to one of the input terminals of a coincidence circuit 42. A numeral code signal issued from the OR circuit 25 is supplied to the other input terminal of the coincidence circuit 42. An output coincidence signal from said coincidence circuit 42 is conducted to a set input terminal of the flip-flop circuit 28.

There will now be described the operation of a tape stop detecting apparatus provided with the modified logic section 19 of FIG. 3. A trigger signal sent forth from the one-shot circuit 18 is gated upon receipt of a synchronization pulse $\phi_e$ and supplied as a clear signal to the up counter through the AND circuit 40. When the contents of the up counter 41 are cleared to zero, said up counter 41 begins to count the time interval measuring reference signals supplied from the reference pulse generator 27. The contents of said up counter 41 are supplied as a time interval measuring signal to one of the input terminals of the coincidence circuit 42. A numeral code signal defining a tape stop detection time corresponding to the traveling speed of a tape specified for a selected functional mode is read out of the numeral code generator 22. The numeral code signal is supplied to the other input terminal of the coincidence circuit 42 through that one of the AND circuits $24_1$, $24_2$, $24_3$ which corresponds to the selected functional mode and then the OR circuit 25. Comparison is made in the coincidence circuit 42 between a number represented by the numeral code signal and the contents of the up counter 41. When coincidence arises between both numbers, a coincidence signal is supplied from the coincidence circuit 42 to the set input terminal of the flip-flop circuit 28, which in turn is set to detect a tape stop. While a tape is running, a trigger signal is issued as a clear signal from the one-shot circuit 18 to the up counter 41 through the AND circuit 40, before coincidence takes place between the contents of the up counter 41 and a number denoted by a numeral code signal preset in the numeral code generator 22. Thus, after its contents are reduced to zero, the up counter 41 again commences up-counting. The above-mentioned operation cycle is repeated, until a tape stops. Since, at this time, a clear signal ceases to be supplied to the up counter 41, a count made by the up counter 41 gradually grows larger until it is equal to a number represented by the numeral code signal preset in the numerical code generator 22. As a result, a coincidence signal is issued from the coincidence circuit 42 to set the flip-flop circuit 28, which in turn detects a tape stop.

In the foregoing embodiment, time interval measuring reference signals were issued from the reference pulse generator 27 in a fixed number per unit time, and a number to be counted by the up counter 41 was varied with the traveling speed of a tape specified for a selected functional mode. Conversely, it is obviously possible to fix a count to be made by the up counter 41 and vary the frequency of the time interval measuring referce pulses issued from the reference pulse generator 27. Further in the foregoing embodiment, one pulse was issued from the pulse generator 13 per 360° rotation of the disc electrode. However, a pulse may be sent forth per 90° or 180° rotation of the disc electrode 15.

What is claimed is:

1. An apparatus for detecting the stop of a magnetic tape traveling in a magnetic recording and reproducing device which includes a rotary drive means for causing a magnetic tape to travel in the recording and reproducing device at a given speed selected from a plurality of speeds, each speed corresponding to at least one of a plurality of functional modes of the recording and reproducing device, the tape stop detecting apparatus comprising:

first pulse generating means coupled to said tape drive means for generating a given number of pulses per rotation of the rotary drive means;

reference pulse generating means for producing reference pulses having a reference frequency;

time measuring means coupled to said first pulse generating means and to said reference pulse generating means for measuring a time interval between the respective pulses generated by said first pulse generating means by counting a number of reference pulses which are generated between respective successive pulses of said first pulse generating means in accordance with the traveling speed of the magnetic tape;

functional mode selecting means for selecting one of said plurality of functional modes of the magnetic recording and reproducing device;

means coupled to said functional mode selecting means for presetting a length of time required to detect the stop of the magnetic tape running at a speed corresponding to a selected functional mode; and detection signal generating means coupled to said time measuring means for detecting that said time interval between respective successive pulses issued from said first pulse generating means, measured by counting of the reference pulses by said time measuring means, exceeds said preset tape stop detection time which corresponds to the selected functional mode, and for then generating a detection signal indicating that the magnetic tape has stopped traveling.

2. The apparatus of claim 1, wherein said time presetting means comprises numeral code generating means in which a plurality of tape stop detection times is preset in the form of a respective plurality of numeral codes.

3. The apparatus of claim 1, wherein:

said time presetting means comprises means for reading out a numeral code signal corresponding to a selected functional mode in synchronization with pulses issued from said first pulse generating means; and said time measuring means includes counting means in which there is preset the numeral code delivered from said presetting means; and means for down counting the number represented by said numeral code preset in the counting means in synchronization with reference pulses issued from said reference pulse generating means.

4. The apparatus of claim 3, wherein said time measuring means comprises a down counter for down counting said number.

5. The apparatus of claim 1, wherein:

said time measuring means comprises counting means for counting reference pulses generated from said reference pulse generating means; and resetting means for resetting said counting means by a pulse generated by said first pulse generating means in synchronization with a pulse sent forth from said reference pulse generating means; and said detection signal generating means includes means for detecting coincidence between the contents of said counting means a number represented by a numeral code signal corresponding to a preset time which in turn corresponds to a selected functional mode.

6. The apparatus of claim 5, wherein said counting means comprises an up counter.

7. The apparatus of any one of claims 1–6, wherein said first pulse generating means generates one pulse per rotation of the rotary drive means.

* * * * *